(12) United States Patent
Fukushi et al.

(10) Patent No.: US 6,307,702 B1
(45) Date of Patent: Oct. 23, 2001

(54) METHOD OF WRITING SERVO TRACKS ON MAGNETIC DISC AND DEVICE FOR THE SAME

(75) Inventors: Masanori Fukushi; Tetsuya Nagai, both of Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/209,103

(22) Filed: Dec. 10, 1998

(30) Foreign Application Priority Data

Jul. 3, 1998 (JP) .................................................. 10-189114

(51) Int. Cl.[7] ............................. G11B 21/02; G11B 5/584
(52) U.S. Cl. ....................... 360/75; 360/78.04; 360/78.11
(58) Field of Search .................................. 360/78.11, 75, 360/77.04, 78.04, 78.12; 369/44.28, 103

(56) References Cited

U.S. PATENT DOCUMENTS 5,771,130 * 6/1998 Baker ...................................... 360/75
5,909,333 * 6/1999 Best et al. .......................... 360/75 X
5,991,112 * 11/1999 Song et al. .............................. 360/75

FOREIGN PATENT DOCUMENTS 8-315531A    11/1996   (JP) .

* cited by examiner

*Primary Examiner*—Andrew L. Sniezek
*Assistant Examiner*—K. Wong
(74) *Attorney, Agent, or Firm*—Greer, Burns & Crain,Ltd.

(57) ABSTRACT

The method of the present invention is capable of shortening the time required for positioning an inner actuator and writing servo track signals on a magnetic disc, and improving the quality of the written servo track signals. The amount of displacement between the inner actuator and an external actuator is detected with a present position of the external actuator. A first deviation between a travel destination of the external actuator and a present position of the inner actuator is detected on the basis of the amount of the displacement, the present position of the external actuator and the travel destination thereof. The inner actuator is controlled so as to make the first deviation within a predetermined standard range.

13 Claims, 12 Drawing Sheets

METHOD OF WRITING SERVO TRACKS ON MAGNETIC DISC AND DEVICE FOR THE SAME

BACKGROUND OF THE INVENTION

The present invention relates to a method of writing tracks on a magnetic disc with signals for positioning a magnetic writing/reading head, which is included in a magnetic disc drive unit, and a device for executing said method.

These days, recording density of magnetic discs have been higher and higher, so the servo tracks must be correctly written thereon. The servo tracks are usually written in manufacturing factories, so time of writing the servo tracks must be shorter so as to improve manufacturing efficiency.

Usually, a plurality of the magnetic discs are accommodated in the magnetic disc drive unit and they are coaxially fixed to a spindle. In each magnetic disc, a plurality of servo tracks are coaxially written like concentric circles, and the signals for positioning the magnetic head are written on the servo tracks. In a factory, the magnetic disc drive unit is assembled and the servo tracks are written on the magnetic discs, by a device for writing the servo tracks, before the magnetic discs are tightly accommodated in the magnetic disc drive unit.

A basic structure of the magnetic disc drive unit will be explained with reference to FIG. 13.

The magnetic disc drive unit 50 comprises: the magnetic discs 52, which are rotated; the magnetic heads 54 for writing data on and reading data from the magnetic discs 52; and an inner actuator 56, which moves the magnetic heads 54 in substantially radial direction of the magnetic discs 52.

Next, a conventional device 58 for writing the servo track on the magnetic discs 52 of the magnetic disc drive unit 50 will be explained.

An external actuator 60 is provided outside of the magnetic disc drive unit 50. The external actuator 60 is capable of moving along a moving track of the inner actuator 56.

The external actuator 60 includes a displacement sensor 62, which is capable of detecting amount $X_1$ of displacement between the external actuator 60 and the inner actuator 56. To detect the amount $X_1$ of the displacement without touching, an optical reflector 64, e.g., a cylindrical mirror, for example, is attached to the inner actuator 56; the displacement sensor 62 is an optical sensor, which is capable of emitting light to the optical reflector 64 and receiving the reflected light therefrom, so that it detects the amount of displacement between the optical reflector 64 and the displacement sensor 62.

With this structure, the displacement sensor 62 is capable of detecting the amount of displacement between the optical reflector 64 and the displacement sensor 62, and the detected amount of the displacement is the amount $X_1$ of the displacement between the external actuator 60 and the inner actuator 56.

The device further has: a position sensor 66 detecting a present position Y of the external actuator 60; a destination setting section setting a travel destination $Y_0$, at which the inner actuator 56 is located when the magnetic heads 54 are located at object positions; and a first control section 70 moving the external actuator 60 to the travel destination $Y_0$ by checking deviation $X_3$ between the present position Y of the external actuator 60, which is detected by the position sensor 66, and the travel destination $Y_0$, and controlling the movement of the external actuator 60 to maintain the deviation $X_3$ within a predetermined range A. A non-touch type optical sensor, for example, is employed as the position sensor 66 as well as the displacement sensor 62, and the position sensor 66 comprises: an optical reflector 66b attached to the external actuator 60; and an optical sensing member 66a capable of emitting light to the optical reflector 66b and receiving the reflected light therefrom to measure distance to the optical reflector 66b as amount of moving the external actuator 60, e.g., rotational angle.

In the conventional device, voice coil motors are employed in the inner actuator 56 and the external actuator 60 as one example. Actuator arms 56a and 60a are respectively provided to the actuators 56 and 60 to move the magnetic heads 54 and the displacement sensor 62 in substantially radial direction of the magnetic discs 52, and the arms 56a and 60a are capable of rotating about a common axis L. With this structure, the external actuator 60 is capable of moving along a moving track (an arc-shaped track) of the inner actuator 56. The reflector 64 and the displacement sensor 62 are respectively attached to the actuator arms 56a and 60a with the same distance from the axis L, so the reflector 64 and the displacement sensor 62 are capable of moving on the same circular track around the axis L. The voice coil motor 60b is provided in the external actuator 60 to rotate the actuator arm 60a.

A second control section 72 controls the inner actuator 56 to make the amount $X_1$ of displacement equal to a predetermined value B. Concretely, a predetermined range (an allowable error range) λ is previously set, and the second control section judges the amount of the displacement is equal to the predetermined value B if $\lambda \geq |X_1 - B|$. On the other hand, the second control section judges the amount $X_1$ of the displacement is not equal to the predetermined value B if $\lambda < |X_1 - B|$. In the case of λ=0, the second control section 72 controls the inner actuator 56 to follow the movement of the external actuator 60 so as to satisfy the formula $\lambda \geq |X_1 - B|$. The predetermined value B is inputted to the second control section 72 by a setting section 74.

In the conventional device, the first and the second control sections 70 and 72 include: a first adjusting unit 76 and a second adjusting unit 78, each of which outputs signals corresponding to difference between two inputted signals; and a first amplifier 80 and a second amplifier 82, which amplify the output signals of the adjusting units 76 and 78 and which output first signals and second signals for driving the inner actuator 56 and the external actuator 60.

With above described structure, the first control section 70 moves the external actuator 60 to and positions the same at the travel destination $Y_0$ by inputting the travel destination $Y_0$ in the destination setting section 68 of the servo track writing device 58.

Then the inner actuator 56 is controlled to follow the external actuator 60 and positioned at the travel destination $Y_0$.

The action will be described in detail with reference to FIG. 14. The travel destination $Y_0$ is inputted (Step 100); the position sensor 66 always detects the present position Y of the external actuator 60 (Step 102); the deviation $X_3$ between the travel destination $Y_0$ and the present position Y, i.e., $X_3 = Y_0 - Y$, is detected; and the absolute value of the deviation $X_3$ is checked to determine if it is in the predetermined range A or not (Step 104).

If the absolute value of the deviation $X_3$ is not in the standard range A, the external actuator 60 is moved toward the travel destination $Y_0$ (Step 102), and the step flow returns to Step 102. By repeating Steps 102–106, the absolute value of the deviation $X_3$ (=$|Y_0 - Y|$) is gradually reduced. When the value is in the standard range A, the external actuator 60 is judged to reach the travel destination $Y_0$, and the step flow returns to Step 102 without moving the external actuator 60.

The action will be explained in detail with reference to FIG. 15. The displacement sensor 62 inputs the amount $X_1$ of the displacement between the inner actuator 56 and the external actuator 60, i.e., the displacement between the displacement sensor 62 and the optical reflector 64 (Step 200). Then the amount $X_1$ of the displacement is compared with the predetermined value B to judge if the deviation $|X_1-B|$ is within the standard range $\lambda$ or not (Step 202). In other words, the amount $X_1$ of the displacement is checked if it satisfies the formula B- $\lambda \leq X_1 \leq$ B- $\lambda$ or not. Actually, B=0 and $\lambda$=0 so the amount $X_1$ of the displacement is checked to determine if the amount $X_1$ is zero or not.

If the amount $X_1$ of the displacement is not zero, the inner actuator 56 is moved toward the external actuator 60 (Step 204), and the step flow returns to Step 200. By repeating Steps 200–204, the inner actuator 56 is moved close to the external actuator 60. If the amount $X_1$ of the displacement is equal to the predetermined value B, the inner actuator 56 is judged to reach the external actuator 60, so the step flow returns to Step 200 without moving the inner actuator 56.

By the above described action, the external actuator reaches the travel destination $Y_0$, then inner actuator 60 also reaches the same travel destination $Y_0$. With this action, the magnetic heads 54, which are moved in substantially radial direction of the magnetic discs 52, are positioned at the object positions. Then the servo track signals are written on the tracks of the magnetic discs 52, in which the object positions are included, with the magnetic heads 54.

However, in the conventional servo track writing device 58, the external actuator 60 is controlled on the basis of the inputted travel destination $Y_0$. And, as shown in FIG. 16, the inner actuator 56 is always controlled to follow the external actuator 60 and to move toward the present position Y of the external actuator 60, which precedes the inner actuator 56 and moves to the travel destination $Y_0$, as an object.

With this action, there is a disadvantage in that the external actuator 60 is positioned prior to the inner actuator 56, so time for positioning the inner actuator 56 is always longer than that for positioning the external actuator 60. 56, so time for positioning the inner actuator 56 is always longer than that for positioning the external actuator 60.

While the magnetic heads 54, which have been positioned at the object positions, write the servo track signals, it is necessary to prevent vibration of the magnetic heads 54.

The vibration is caused by operator's action for operating the device 58 or conducted via a floor on which the device 58 is installed. In any case, the device 58 is vibrated and the vibration is conducted to the magnetic disc drive unit 50, which has been connected with the device 58.

However, in the conventional device 58, the inner actuator 56 is controlled to follow the present position of the external actuator 60, so the inner actuator 56 is vibrated as well as the external actuator 60 when the external actuator 60 is vibrated. Amplitude of the vibration of the inner actuator 56 is equal to that of the external actuator 60; by considering overshoot and undershoot, the amplitude of the inner actuator 56 is greater than that of the external actuator 60. By the vibration, quality of the written servo track signals will be worse.

SUMMARY OF THE INVENTION

The present invention is invented to solve the above described disadvantages of the conventional technology. An object of the present invention is to provide a method and a device for writing servo tracks, which are capable of shortening required time for positioning the inner actuator and writing the servo track signals; another object is to provided the method and the device capable of improving the quality of the written servo track signals by preventing the vibration of the inner actuator.

To achieve the objects, the method of writing servo tracks on a magnetic disc with signals for positioning a magnetic head, which is included in a magnetic disc drive unit having the magnetic head for writing data on and reading data from the magnetic disc, and an inner actuator for moving the magnetic head in substantially radial direction of the disc, comprises the steps of: detecting amount of displacement between the inner actuator and an external actuator, which is provided outside of the magnetic disc drive unit and which is capable of moving along a moving track of the inner actuator, and a present position of the external actuator; detecting first deviation between a travel destination of the external actuator and a present position of the inner actuator on the basis of the amount of the displacement, the present position of the external actuator and the travel destination thereof; and controlling the movement of the inner actuator so as to make the first deviation within a predetermined standard range.

In the method, the travel destination may be a position at which the inner actuator is located when the magnetic head gets to an object position.

In the method, the present position of the inner actuator may be detected by adding the amount of the displacement to the present position of the external actuator.

In the method, the movement of the external actuator may be controlled on the basis of feed-forward data according to the travel destination and second deviation between the travel destination and the present position of the external actuator when the external actuator is moved to the travel destination.

In the method, the movement of the inner actuator may be controlled on the basis of feed-forward data according to the travel destination and the first deviation when the inner actuator is moved to the travel destination.

In the method, the first deviation may be detected on the basis of second deviation, which is deviation between the travel destination and the present position of the external actuator, and the amount of the displacement.

The device for writing servo tracks on a magnetic disc with signals for positioning a magnetic head, which is included in a magnetic disc drive unit having the magnetic head for writing data on and reading data from the magnetic disc, and an inner actuator for moving the magnetic head in substantially radial direction of the disc, comprises: an external actuator being provided outside of the magnetic disc drive unit, the external actuator being capable of moving along a moving track of the inner actuator; a displacement sensor detecting amount of displacement between the inner actuator and the external actuator; a position sensor detecting a present position of the external actuator; a first control section moving the external actuator to a travel destination on the basis of the present position of the external actuator; and a second control section detecting first deviation between the travel destination of the external actuator and a present position of the inner actuator on the basis of the amount of the displacement, the present position of the external actuator and the travel destination thereof, the second control section controlling the movement of the inner actuator so as to make the first deviation within a predetermined standard range.

The device may further comprise a destination setting section setting a position, at which the inner actuator is located when the magnetic head gets to an object position, as the travel destination.

In the device, the second control section may include an adding section for detecting the present position of the inner actuator by adding the amount of the displacement to the present position of the external actuator.

In the device, the first control section may include a first feed-forward section for outputting first feed-forward data corresponding to the travel destination, and the external actuator may be moved to the travel destination on the basis of the present position of the external actuator and the first feed-forward data.

In the device, the second control section may include a second feed-forward section for outputting second feed-forward data corresponding to the travel destination, and the inner actuator may be controlled on the basis of the first deviation and the second feed-forward data.

In the device, the second control section may include a subtracting section for detecting second deviation, which is deviation between the travel destination and the present position of the external actuator, and the second control section detects the first deviation on the basis of the second deviation and the amount of the displacement.

In the device, the inner actuator may have an optical reflector, and the displacement sensor may emit light to the optical reflector and receive the reflected light, and the displacement sensor may detect amount of displacement between the optical reflector and the displacement sensor, without touching, as the amount of the displacement.

In the method and the device of the present invention, the movement of the inner actuator is controlled on the basis of the first deviation between the travel destination and the present position of the inner actuator. Unlike the conventional technology in which the inner actuator is controlled to follow the position of the external actuator as an object, the inner actuator is controlled to move to the travel destination without reference to the present position of the external actuator. Therefore, the inner actuator can be positioned at the travel destination even if positioning of the external actuator is not completed, and the time for positioning the inner actuator can be shortened.

The inner actuator is not moved even if the external actuator is vibrated, so the quality of the written servo track signals can be improved. By making the inner actuator stable against the external vibration, density of the tracks on the magnetic disc can be higher.

Further, by controlling the movement of the inner actuator and the external actuator on the basis of the feed-forward data, the overshoot and the undershoot can be reduced and the actuators can get to or converge at the travel destination in a short time, so that the time for writing the servo track signals can be shortened.

BRIEF DESCRIPTION OF THE DRAWINGS

Embodiments of the present invention will now be described by way of examples and with reference to the accompanying drawings, in which.

DETAILED DESCRIPTION OF THE PREFERRED EMBODIMENTS

Preferred embodiments of the present invention will now be described in detail with reference to the accompanying drawings. Note that, the elements explained in BACKGROUND OF THE INVENTION are assigned the same reference symbols and detail explanation will be omitted.

Figure 1:
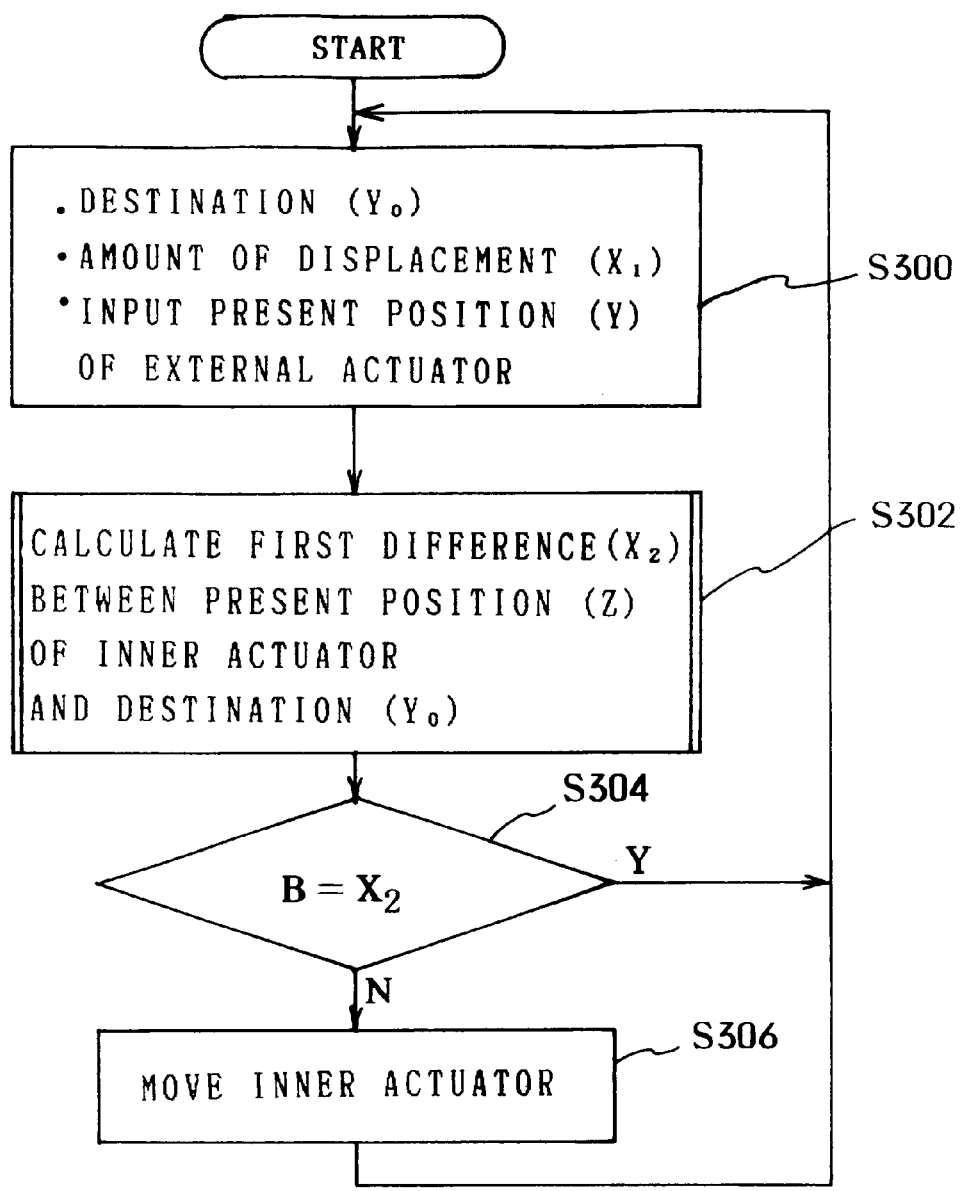
FIG. 1 is a flow chart of controlling an inner actuator of an embodiment of the present invention.
Figure 2:
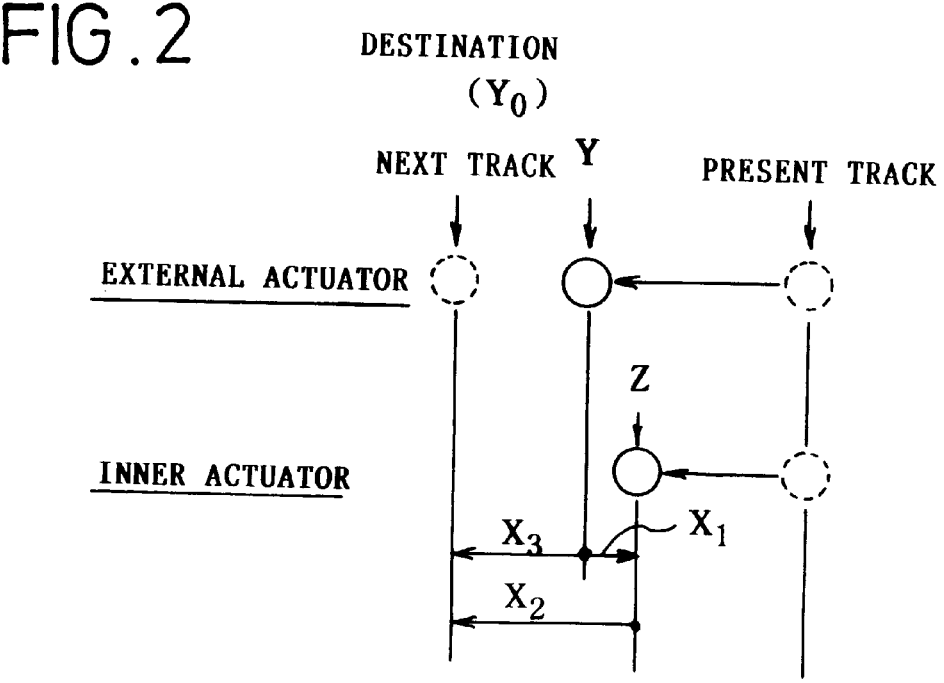
FIG. 2 is an explanation view showing action of the inner actuator and an external actuator of the embodiment.

Firstly, basic idea of the method of the present invention will be explained with reference to FIGS. 1 and 2.

Figure 14:
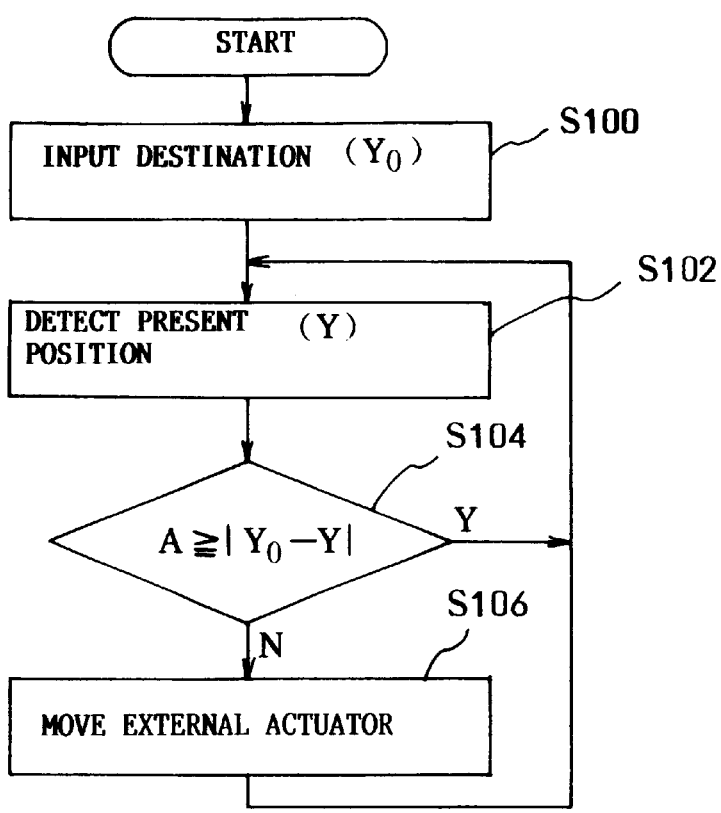
FIG. 14 is a flow chart showing action of an external actuator of the device shown in FIG. 13.

Characteristic point of the present invention is a control of moving the inner actuator 56. Note that, the external actuator 60 is controlled as well as the method shown in FIG. 14 and explanation will be omitted.

First Embodiment

The control of moving the inner actuator 56 will be explained in detail.

Firstly, the travel destination $Y_0$ and the amount $X_1$ of the displacement and the present position Y of the external actuator 60 are inputted to a control system of the inner actuator 56 (Step 300). In the conventional technology, the amount $X_1$ of the displacement is solely inputted.

First deviation $X_2$ is calculated on the basis of the travel destination $Y_0$ and the amount $X_1$ of the displacement and the present position Y (Step 302).

Note that, in the present embodiment, the words "amount of displacement" means distance between two members; the word "deviation" means distance between a present position and an object position.

Figure 15:
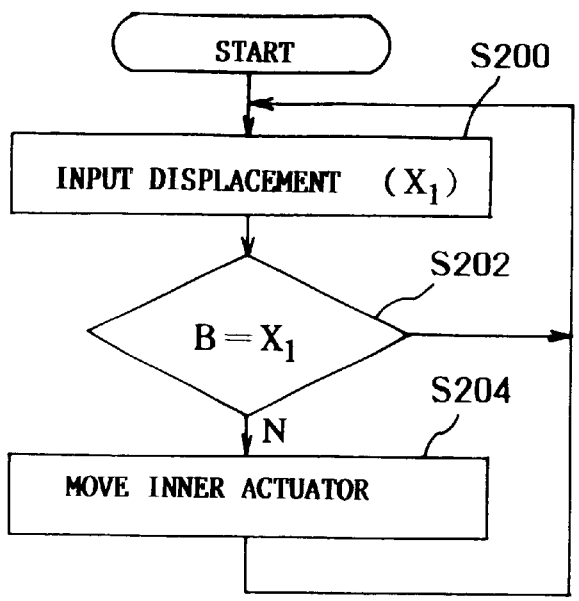
FIG. 15 is a flow chart showing action of an inner actuator of the device shown in FIG. 13.
Figure 16:
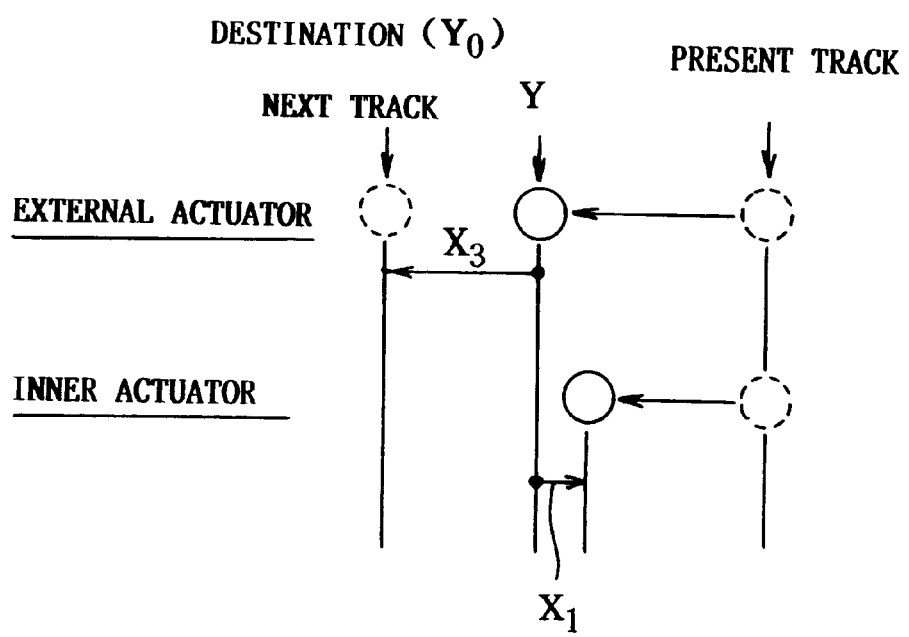
FIG. 16 is an explanation view showing the action of the inner actuator and the external actuator of the device shown in FIG. 13.

The first deviation $X_2$ is judged if it is equal to the predetermined value B or not (Step 304). The judgment is executed as well as Step 202 shown in FIG. 15, namely the first deviation $X_2$ is judged to determined if it satisfies the condition $\lambda \geq |X_2-B|$ or not. Note that, $\lambda=0$ and $B=0$.

If the first deviation $X_2$ is not equal to the predetermined value B, the inner actuator 56 is moved toward the travel destination $Y_0$ so as to satisfy the condition or so as to make the first deviation $X_2$ close to zero (Step 306), then the step flow returns to Step 300. By repeating Steps 300–306, the inner actuator 56 is moved close to the travel destination $Y_0$. If the first deviation $X_2$ is equal to the predetermined value B, the inner actuator 56 is judged to reach the travel destination $Y_0$, and the step flow returns to Step 300 without moving the inner actuator 56.

In the above described control of the inner actuator 56, the inner actuator 56 is directly controlled to maintain the first deviation $X_2$, which is the deviation between the present position Z of the inner actuator 56 and the travel destination $Y_0$, within the standard range B. Thus, unlike the conventional method in which the inner actuator 56 is controlled to follow the external actuator 60, the control of the inner actuator 56 is not influenced by the present position Y of the external actuator 60.

Therefore, the inner actuator 56 can be positioned in a short time even if the positioning of the external actuator 60 is not completed.

In the case of vibrating the external actuator 60, unlike the conventional device in which the inner actuator 56 is move by the vibration, bad influence caused by the vibration can be prevented.

In Step 302, the first deviation $X_2$ can be calculate by following two manners.

Figure 3:
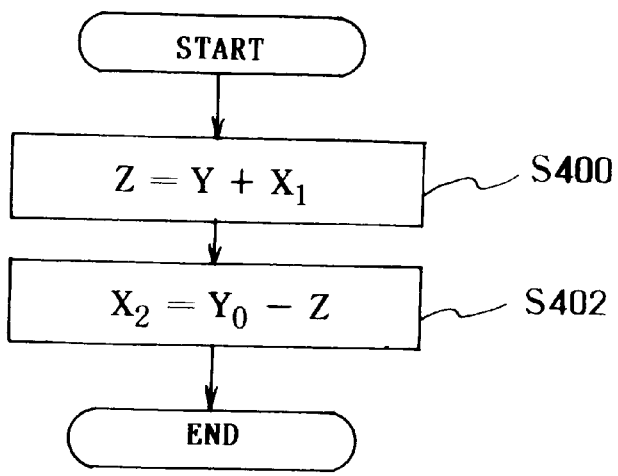
FIG. 3 is a flow chart explaining Step 302 of FIG. 1.

A first manner is executed by the steps shown in FIG. 3. As shown in FIG. 2, the present position Y of the external actuator 60 is added to the amount $X_1$ of the displacement to detect the present position Z of the inner actuator 56 (Step 400). Next, the present position Z of the inner actuator 56 is subtracted from the travel destination $Y_0$ to detect the first deviation $X_2$ (Step 402).

A structure of the servo track writing device 10, which employs said first manner, will be explained with reference to FIG. 4.

The device 10 has the external actuator 60, the control system thereof (the first adjusting unit 76, the first amplifier 80 and the position sensor 66) and the inner actuator 56 as well as the conventional device. The elements explained in the conventional device are assigned the same reference symbols and explanation will be omitted.

The control system of the inner actuator 56, especially the second control section 12, which is the characteristic point of the device 58, will be explained.

The second control section 12 calculates the first deviation $X_2$, which is the deviation between the travel destination $Y_0$ and the present position Z of the inner actuator 36, on the basis of the amount $X_1$ of the displacement, the present position Y of the external actuator 60 and the travel destination $Y_0$. And the second control section 12 controls the inner actuator 56 to make the first deviation $X_2$ within the predetermined range B.

The second control section 12 has an adding section 14, which detects the present position Z of the inner actuator 56 by adding the present position Y of the external actuator 60 to the amount $X_1$ of the displacement.

The present position Z of the inner actuator 56 and the travel destination $Y_0$ are inputted to the second adjusting unit 78. The second adjusting unit 78 subtracts the present position Z of the inner actuator 56 from the travel destination $Y_0$ and outputs signals, which corresponds to the difference (the first deviation $X_2$) between two inputted signals, which indicates the present position Z and the travel destination $Y_0$. The second amplifier 82 amplifies the signals outputted to make second control signals, which drive the inner actuator 56.

Figure 5:
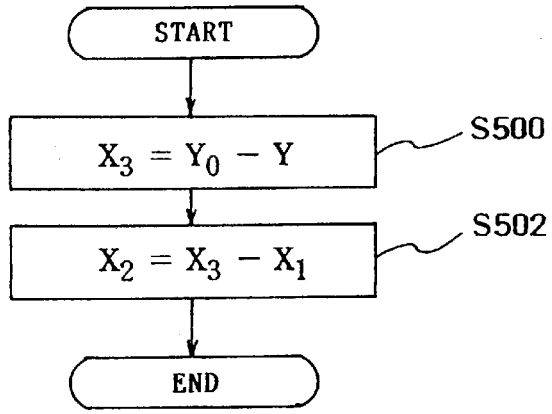
FIG. 5 is a flow chart explaining another process of Step 302 of FIG. 1.

A second manner is executed by the steps shown in FIG. 5. As shown in FIG. 2, the present position Y of the external actuator 60 is subtracted from the travel destination $Y_0$ to detect the second deviation $X_3$ to the travel destination $Y_0$ of the external actuator 60 (Step 500). Next, the amount $X_1$ of the displacement is subtracted from the second deviation $X_3$ to detect the first deviation $X_2$ (Step 502). As shown in FIG. 2, the present position Y of the external actuator 60 is subtracted from the travel destination $Y_0$ to detect the second deviation $X_3$ to the travel destination $Y_0$ of the external actuator 60 (Step 500). Next, the amount $X_1$ of the displacement is subtracted from the second deviation $X_3$ to detect the first deviation $X_2$ (Step 502).

Figure 6:
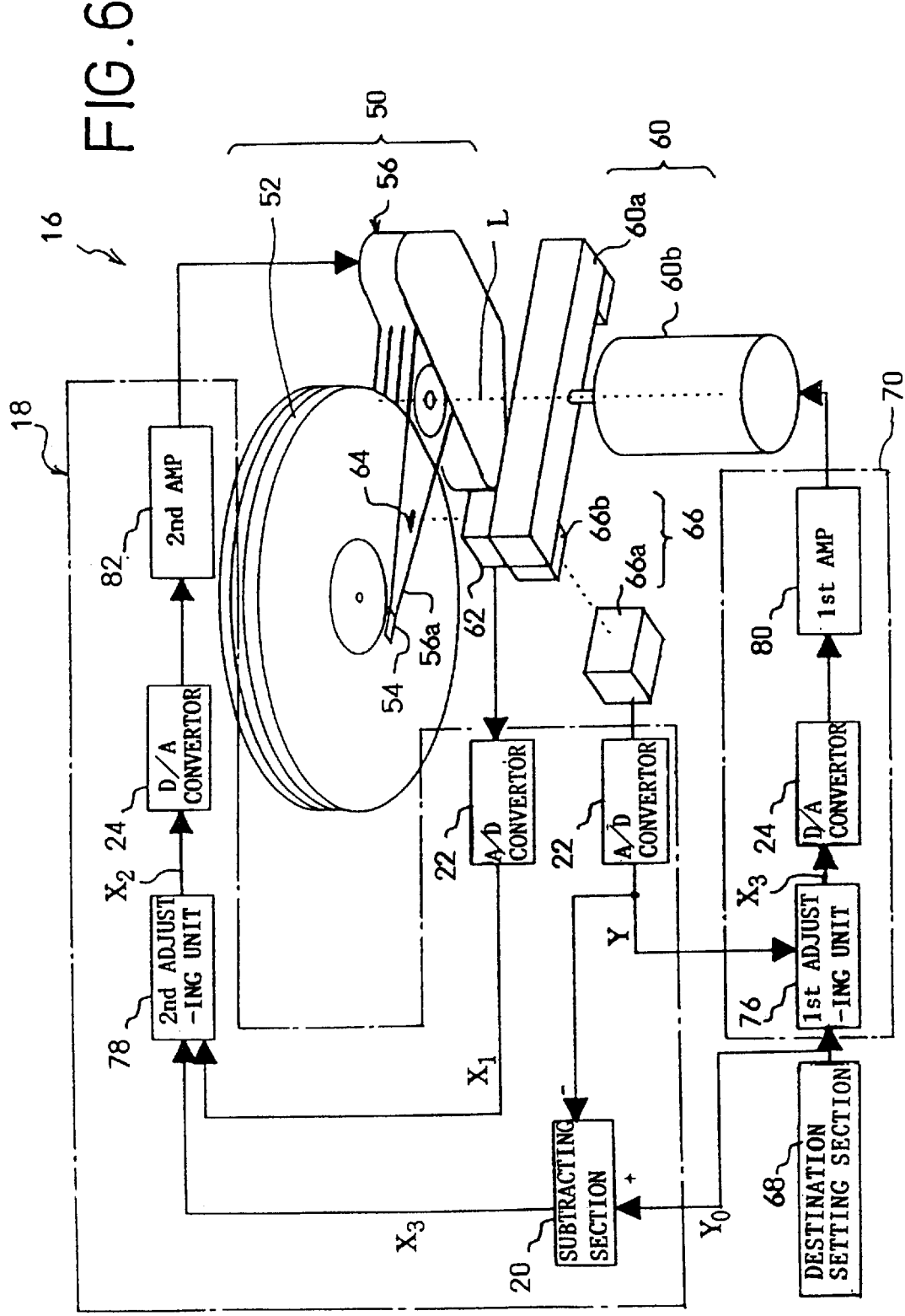
FIG. 6 is a block diagram of the servo track writing device of the embodiment, which executes the steps shown in FIG. 5.

A structure of the servo track writing device 16, which employs said second manner, will be explained with reference to FIG. 6.

Function of the second control section 18 is the same as that of the second control section 12 of the first manner, so explanation will be omitted.

The second control section 18 has a subtracting section 20, which detects the difference between the travel destination $Y_0$ and the present position Y of the external actuator 60 (the second deviation $X_3$).

The second deviation $X_3$ and the amount $X_1$ of the displacement are inputted to the second adjusting unit 78. The second adjusting unit 78 subtracts the amount $X_1$ of the displacement from the second deviation $X_3$, and outputs signals, which corresponds to the difference between two inputted signals, which indicate the second deviation $X_3$ and the amount $X_1$ of the displacement. The difference between the second deviation $X_3$ and the amount $X_1$ of the displacement is the first deviation $X_2$ as shown in FIG. 2. The second amplifier 82 amplifies the signals outputted, which indicate the first deviation $X_2$, to make second controls signals, which drive the inner actuator 56, as well as the first manner.

In the present embodiment, the first adjusting unit 76, the second adjusting unit 78, the subtracting section 20 and the destination setting section 68 are driven by digital signals; other elements, e.g., the displacement sensor 62, the position sensor 66, are driven by analog signals. For example, the elements driven by digital signals may be realized by digital signal processors (DPS) with proper programs.

There are provided A/D converters 22 and D/A converters 24 between the digital elements and the analog elements. Note that, by employing the first manner in which all elements are driven by analog signals, the A/D and D/A converters are not used.

Figure 7:
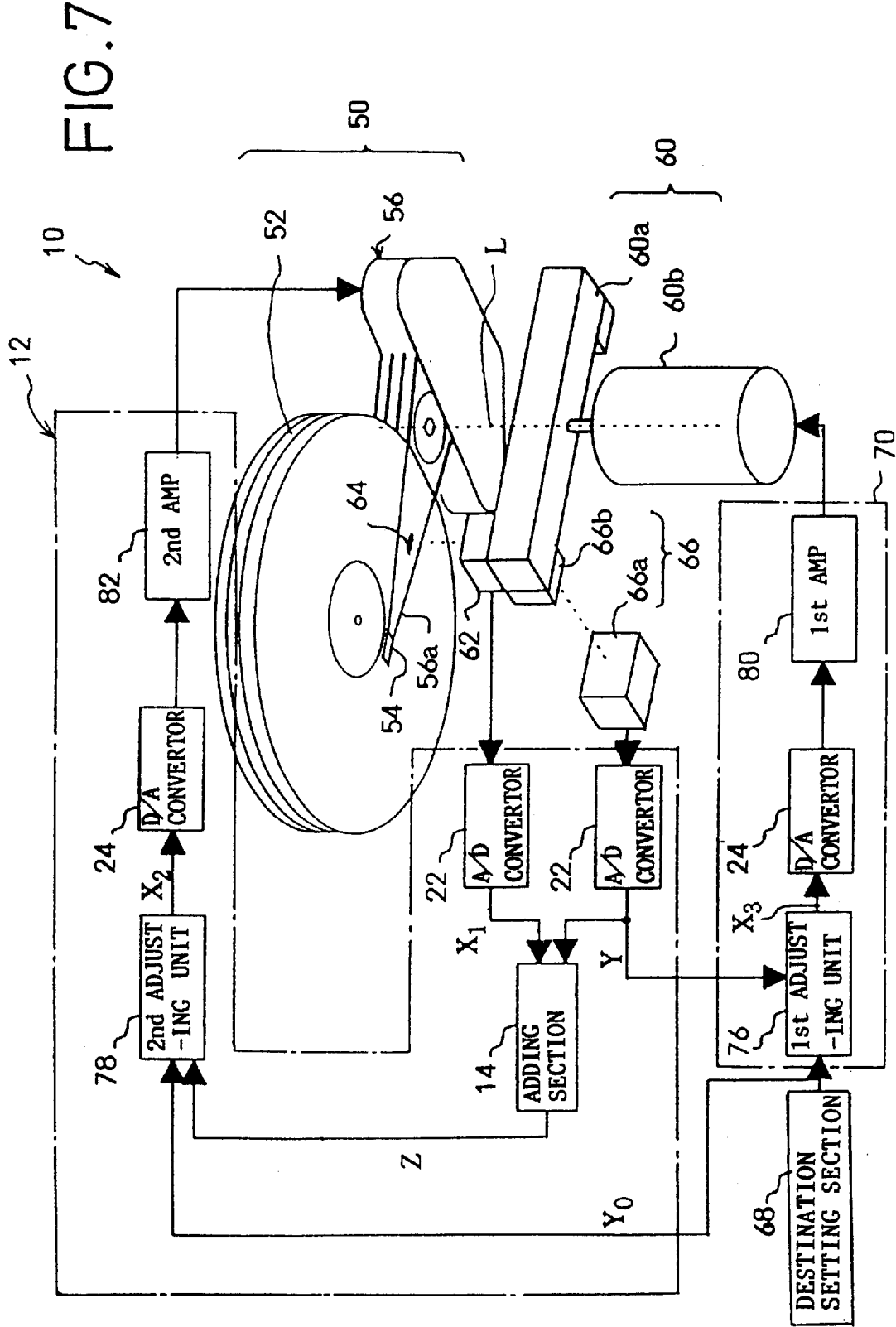
FIG. 7 is a block diagram of the servo track writing device shown in FIG. 4, in which signals are processed by a DSP.

On the other hand, the first manner may be executed by the first adjusting unit 76, the second adjusting unit 78, the adding section 14, the destination setting section 68, which are driven by digital signals, and the displacement sensor 62, the position sensor 66, etc., which are driven by analog signals, as well as the second manner. In this case, the A/D converters 22 and the D/A converters 24 are provided between the digital elements and the analog elements (see FIG. 7).

Second Embodiment

The characteristic point of the method of the present embodiment is that the movement of the inner actuator 56 and the external actuator 60 are controlled on the basis of feed-forward data corresponding to the travel destination $Y_0$ so as to move the inner actuator 56 and the external actuator 60 to the travel destination $Y_0$.

In detail, the control of the movement of the inner actuator 56 is executed on the basis of the feed-forward data corresponding to the travel destination $Y_0$ and the first deviation $X_2$.

And, the control of the movement of the external actuator 60 is executed on the basis of the feed-forward data corresponding to the travel destination $Y_0$, and the difference between the travel destination Y. and the present position Y of the external actuator 60 (the second deviation $X_3$).

By employing the feed-forward data with other data so as to control the movement of the actuators 56 and 60, the actuators 56 and 60 can be reached or converged at the travel destination $Y_0$, in a short time, with less overshoot and undershoot.

Successively, the servo track writing device for executing the method of the present embodiment will be explained.

Figure 8:
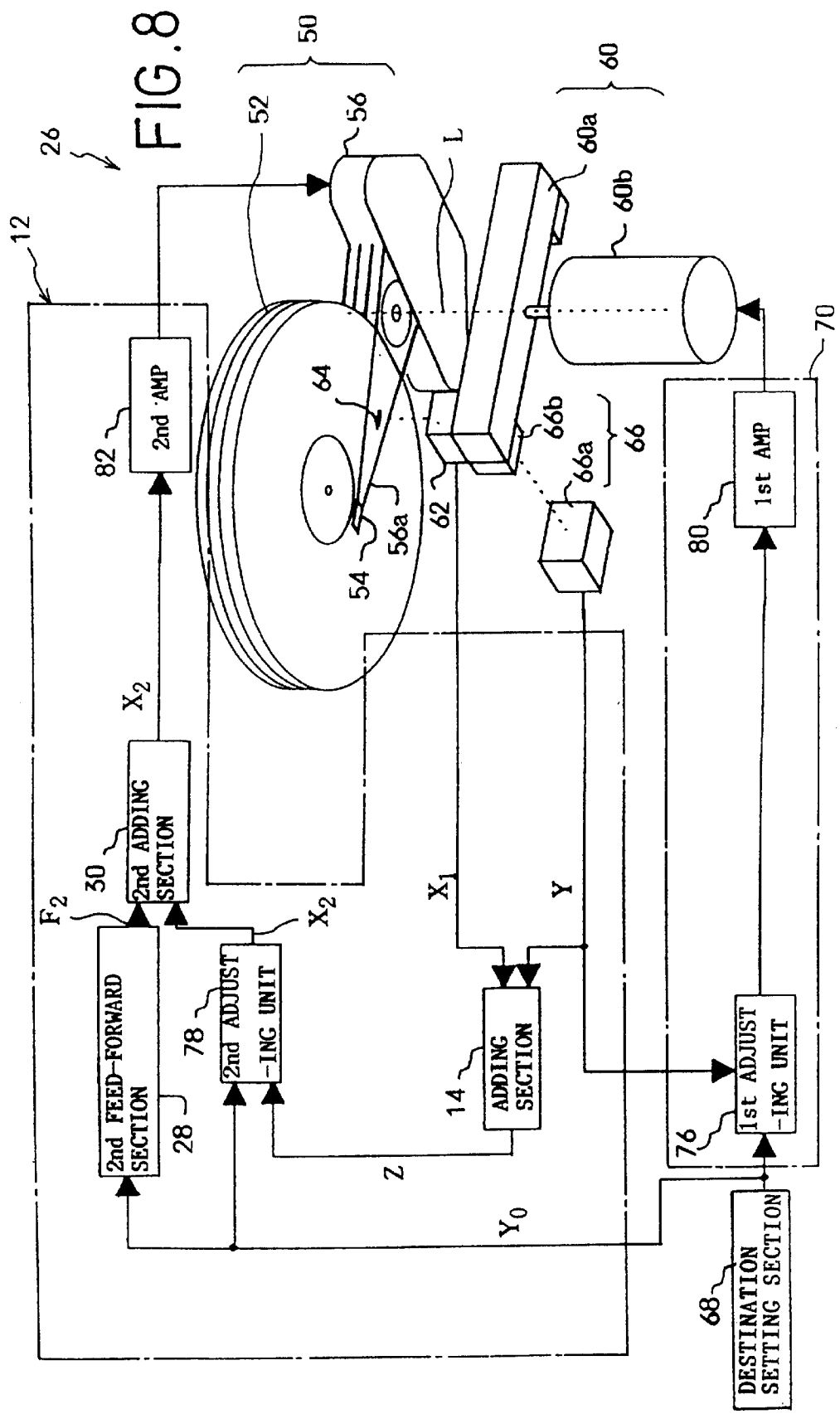
FIG. 8 is a block diagram of the servo track writing device, in which the inner actuator is controlled on the basis of feed-forward data.

The servo track writing device 26, which controls the inner actuator 56 on the basis of the feed-forward data corresponding to the travel destination $Y_0$, will be explained with reference to FIG. 8.

In the device 26, a second feed-forward section 28, which outputs second feed-forward data $F_2$ corresponding to the travel destination $Y_0$, is added to the second control section 12, which executes the first manner of First Embodiment as well as the servo track writing device 10.

Further, a second adding section 30 is provided to add the second feed-forward data $F_2$ to the first deviation $X_2$ and output the result.

A second amplifier 82 amplifies the signals from the second adding section 30 and inputs the amplified signals to the inner actuator 56 to drive.

With this structure, the second control section 72 controls the movement of the inner actuator 56, on the basis of the first deviation $X_2$ and the second feed-forward data $F_2$, so as to make the first deviation $X_2$ within the predetermined range B.

The external actuator 60, the control system of the external actuator 60 (the first adjusting unit 76 and the first amplifier 80), the position sensor 66 and the inner actuator 56, which are employed in the conventional servo track writing device, are employed in the device 26.

Figure 9:
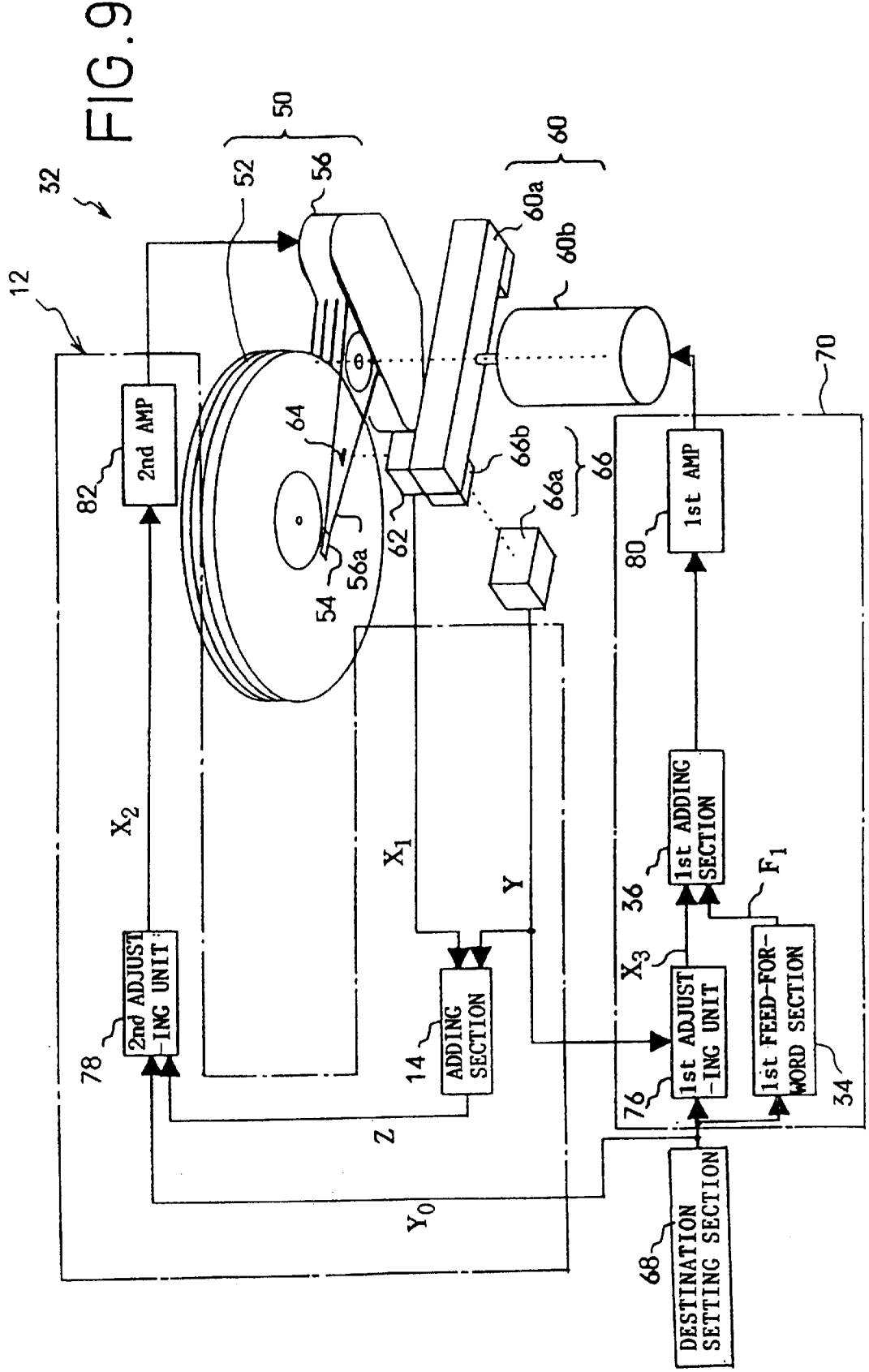
FIG. 9 is a block diagram of the servo track writing device, in which the external actuator is controlled on the basis of the feed-forward data.

Next, the servo track writing device which controls the external actuator 60 on the basis of the feed-forward data corresponding to the travel destination $Y_0$ will be explained with reference to FIG. 9.

In the servo track writing device 32, a first feed-forward section 34, which outputs first feed-forward data $F_1$ corresponding to the travel destination $Y_0$, is added to the first control section 70, which executes the first manner of First Embodiment as well as the servo track writing device 10.

Further, a first adding section 36 is provided to add the first feed-forward data $F_1$ to the second deviation $X_3$ and output the result.

A first amplifier 80 amplifies the signals from the first adding section 36 and inputs the amplified signals to the external actuator 60 to drive.

With this structure, the first control section 70 controls the movement of the external actuator 60, on the basis of the second deviation $X_3$ and the first feed-forward data $F_1$, so as to make the second deviation $X_3$ within the predetermined range A.

The inner actuator 56, the control system of the inner actuator 56 (the second adjusting unit 78 and the second amplifier 82), the external actuator 60 and the position sensor 66, which are employed in the conventional servo track writing device, are employed in the device 32.

In the present invention, the inner actuator 56 is positioned with reference to the present position Y of the external actuator 60, so the external actuator 60 can be controlled without using the feed-forward data. But the present position Y of the external actuator 60 is used when the first deviation $X_2$ of the inner actuator 56 is detected, so error of the first deviation $X_2$ can be reduced and the inner actuator can be correctly moved to the travel destination $Y_0$ by converging the external actuator 60 at the travel destination $Y_0$ for a shorter time without overshoot and undershoot. Thus, it is advantageous to control the movement of the external actuator 60 on the basis of the first feed-forward data $F_1$ as described above.

Figure 10:
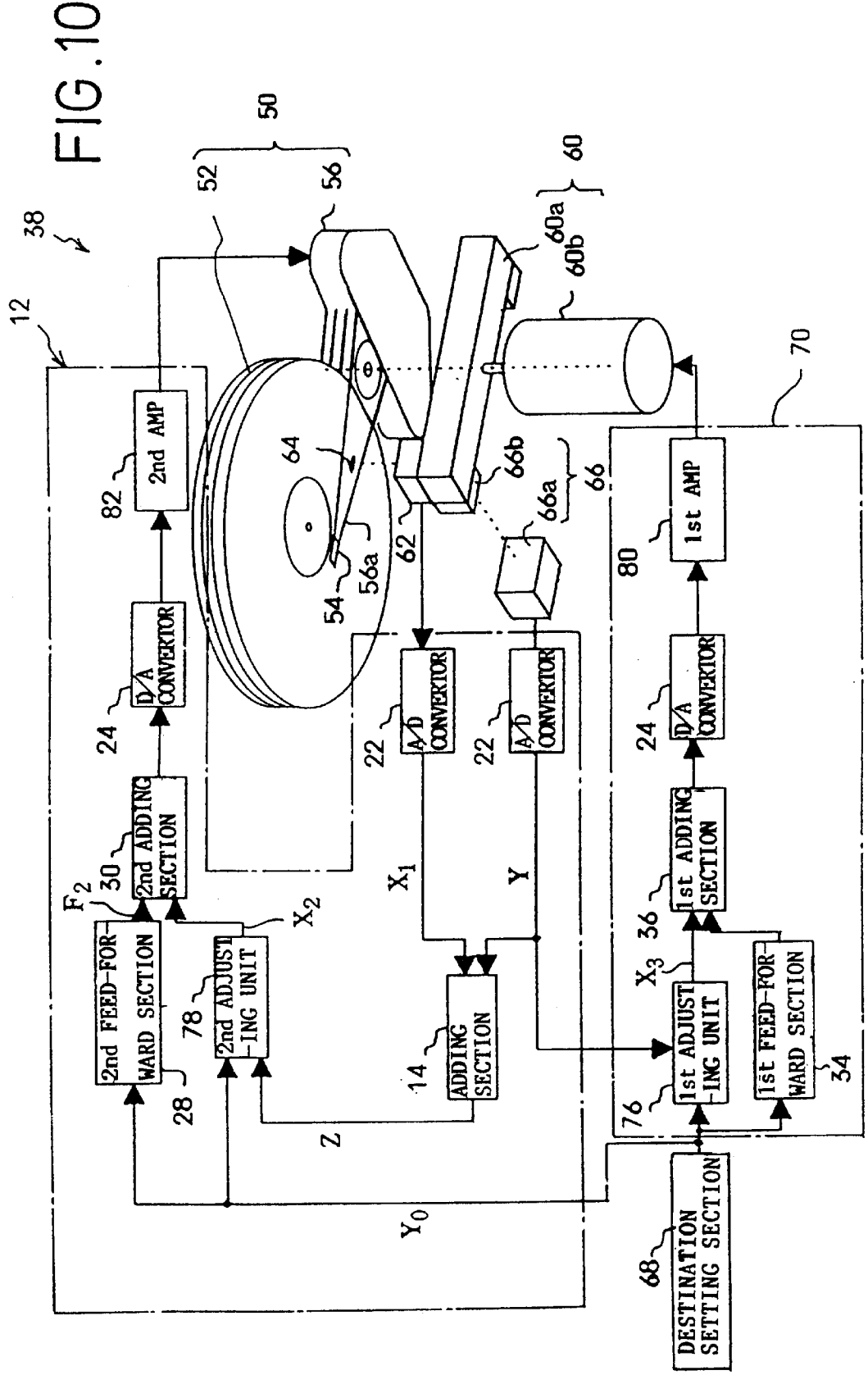
FIG. 10 is a block diagram of the servo track writing device, in which the inner actuator and the external actuator are controlled on the basis of the feed-forward data.

As shown in FIG. 10, the first feed-forward section 34 and the first adding section 36 may be provided in the first control section 70, the second feed-forward section 28 and the second adding section 30 may be provided in the second control section 12, and the inner actuator 56 and the external actuator 60 may be controlled on the basis of the feed-forward data. Note that, in the servo track writing device 38, the A/D converters 22 and the D/A converters 24 are employed as well as the device 16 shown in FIG. 7, but the whole system may be driven by analog signals without the A/D converters 22 and the D/A converters 24.

Figure 4:
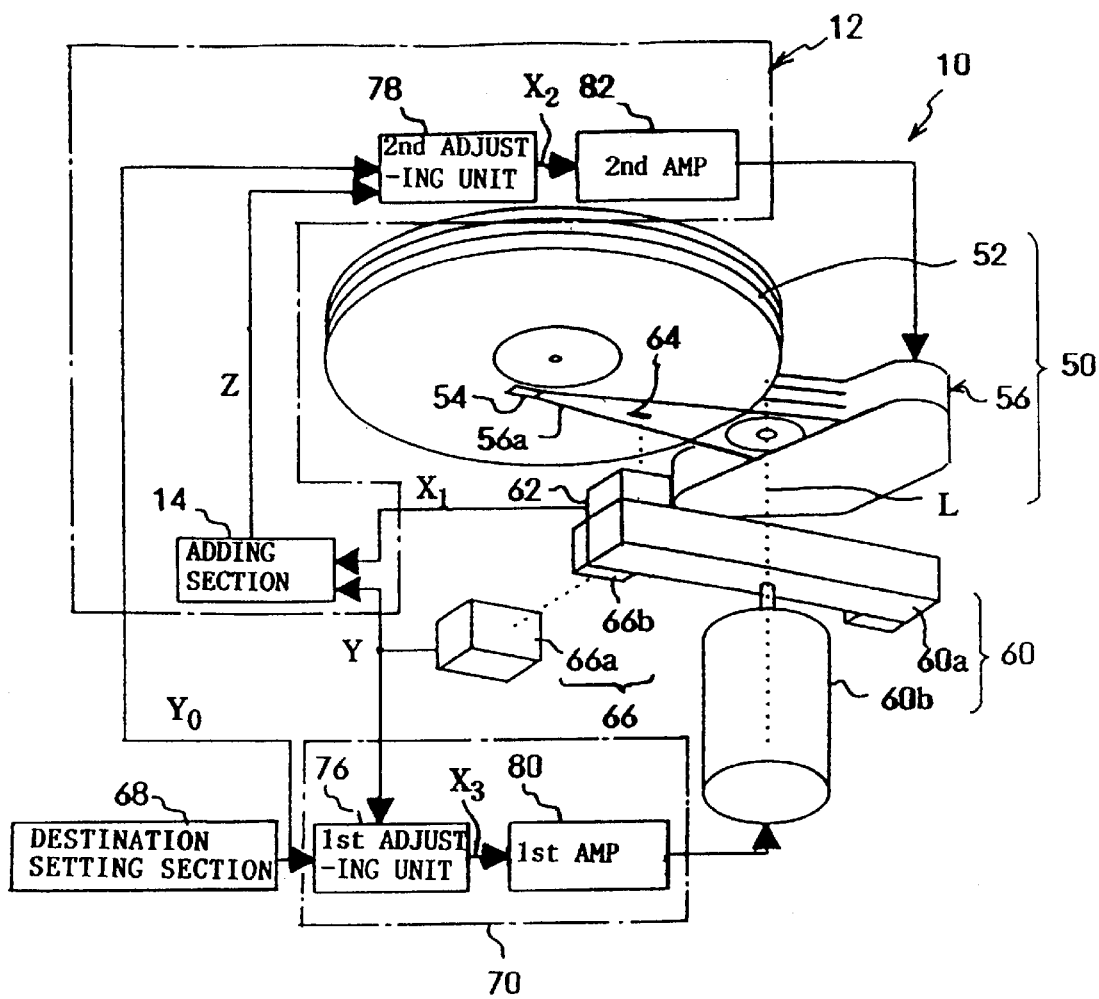
FIG. 4 is a block diagram of a servo track writing device of the embodiment, which executes the steps shown in FIG. 3.
Figure 13:
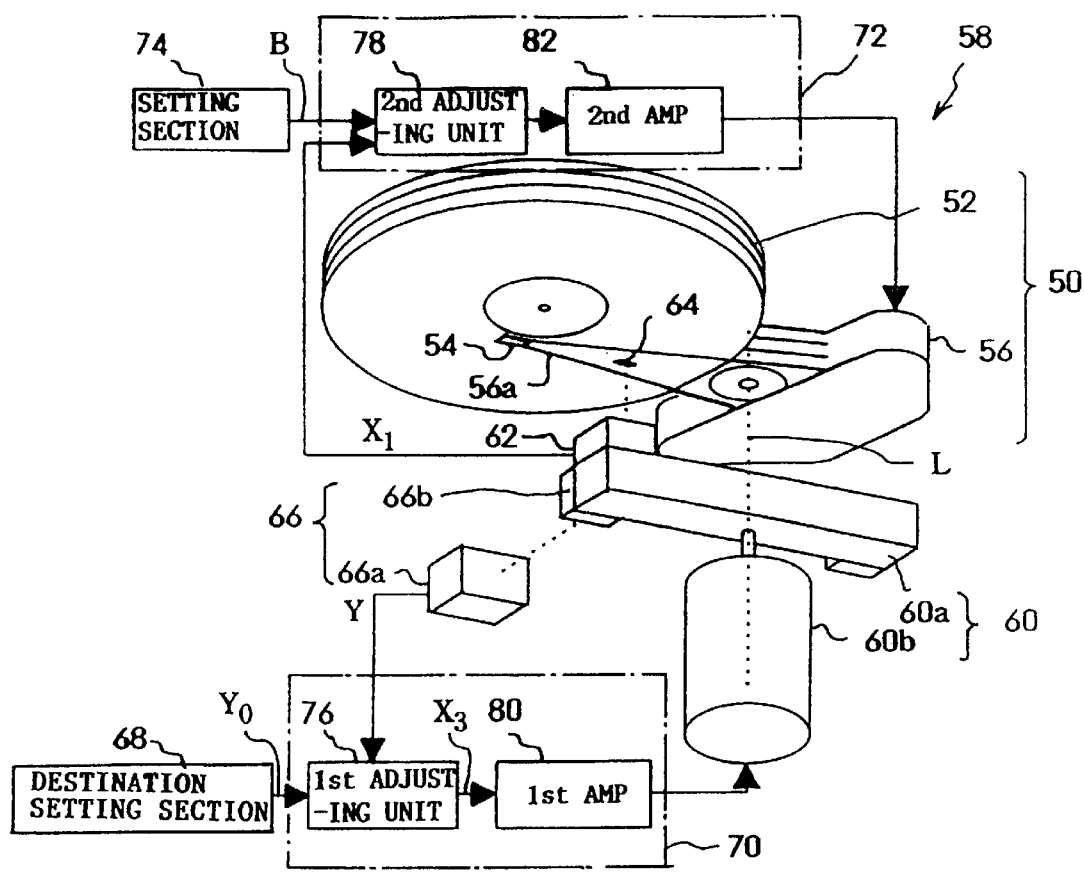
FIG. 13 is a block diagram of the conventional servo track writing device.

Simulation of the positioning action of the inner actuator and the external actuator were executed for the device 10 shown in FIG. 4 and the conventional device 58 shown in FIG. 13 so as to compare the convergence time of both. In both devices 10 and 58, parameters for elements constituting the external actuators were made equal to equally move the external actuators of both, so that the moving speed (or convergence speed) of the inner actuators of both, with respect to step response, were compared.

Figure 11:
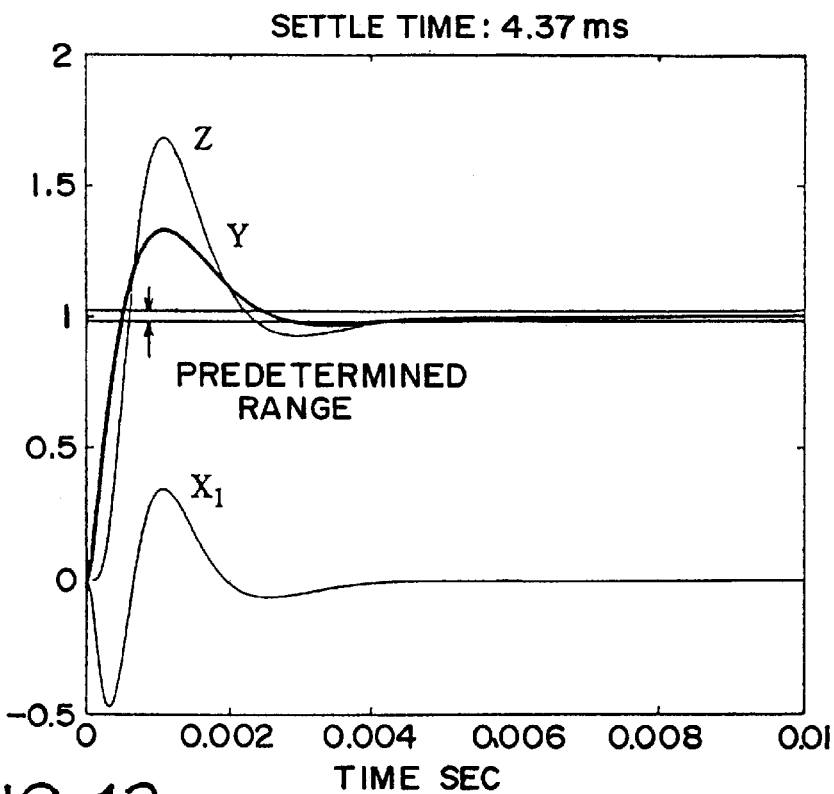
FIG. 11 is a graph showing a simulation of step response of a conventional servo track writing device.
Figure 12:
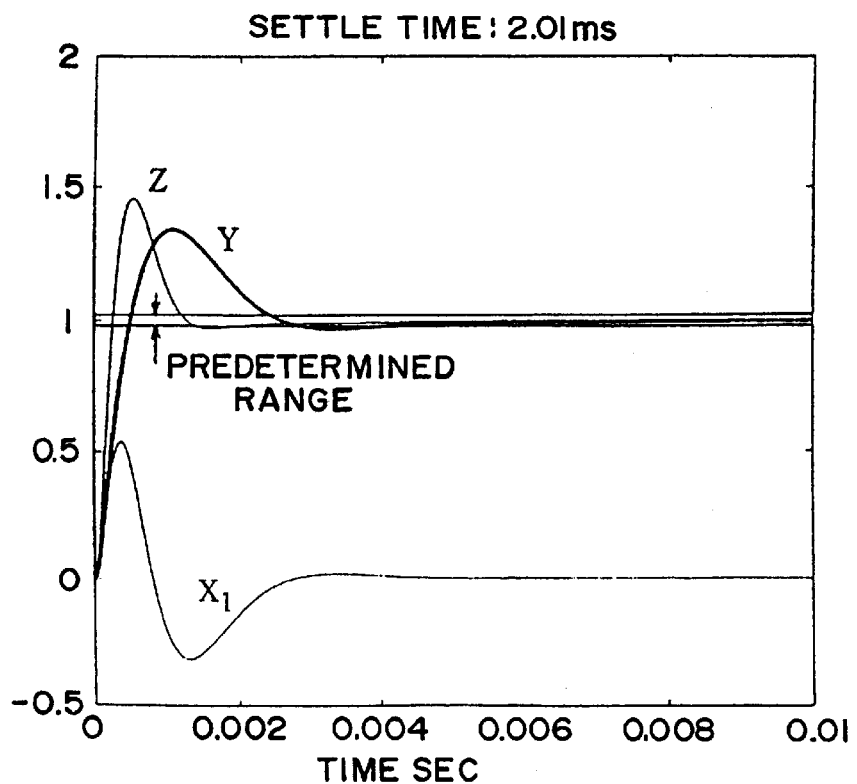
FIG. 12 is a graph showing a simulation of the step response of the servo track writing device of the embodiment.

Step response of the conventional device 58 is shown in FIG. 11; step response of the device 10 of the present invention is shown in FIG. 12.

In the conventional device 58 shown in FIG. 11, after the external actuator converged within a predetermined range, the inner actuator followed the external actuator and converged later than the external actuator. The convergence time of the inner actuator was about 4.37 millisecond from inputting the step.

On the other hand, in the device 10 shown in FIG. 12, the inner actuator moved, faster than the external actuator, toward the predetermined range immediately after the step was inputted. The convergence time of the inner actuator was about 2.01 millisecond from inputting the step, so the inner actuator can be converged in a short time, which is half of the convergence time of the conventional device 58.

In the present invention, the destination setting section 68 may input the object positions of the magnetic heads 54 instead of the travel destination $Y_0$ of the actuators 56 and 60. In this case, the object positions may be converted into the travel destination $Y_0$ of the actuators 56 and 60 by the control sections 12 and 70.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and ranging of equivalency of the claims are therefore intended to be embraced therein.

What is claimed is:

1. A method of writing servo tracks on a magnetic disc with signals for positioning a magnetic head, which is included in a magnetic disc drive unit having said magnetic head for writing data on and reading data from said magnetic disc, and an inner actuator for moving said magnetic head in substantially radial direction of said disc, comprising the steps of:

detecting amount of displacement between said inner actuator and an external actuator, which is provided outside of said magnetic disc drive unit and which is capable of moving along a path of said inner actuator, and a present position of said external actuator;

detecting first deviation between a travel destination of said external actuator and a present position of said inner actuator on the basis of the amount of the displacement, the present position of said external actuator and the travel destination thereof; and controlling the movement of said inner actuator so as to make the first deviation within a predetermined standard range.

2. The method according to claim 1, wherein said travel destination is a position at which said inner actuator is located when said magnetic head gets to an object position.

3. The method according to claim 1, wherein the present position of said inner actuator is detected by adding the amount of the displacement to the present position of said external actuator.

4. The method according to claim 3, wherein the movement of said external actuator is controlled on the basis of feed-forward data according to the travel destination and second deviation between the travel destination and the present position of said external actuator when said external actuator is moved to the travel destination.

5. The method according to claim 3, wherein the movement of said inner actuator is controlled on the basis of feed-forward data according to the travel destination and the first deviation when said inner actuator is moved to the travel destination.

6. The method according to claim 1, wherein the first deviation is detected on the basis of second deviation, which is deviation between the travel destination and the present position of said external actuator, and the amount of the displacement.

7. A device for writing servo tracks on a magnetic disc with signals for positioning a magnetic head, which is included in a magnetic disc drive unit having said magnetic head for writing data on and reading data from said magnetic disc, and an inner actuator for moving said magnetic head in substantially radial direction of said disc, comprising:

an external actuator being provided outside of said magnetic disc drive unit, said external actuator being capable of moving along a path of said inner actuator;

a displacement sensor detecting amount of displacement between said inner actuator and said external actuator;

a position sensor detecting a present position of said external actuator;

a first control section moving said external actuator to a travel destination on the basis of the present position of said external actuator; and a second control section detecting first deviation between the travel destination of said external actuator and a present position of said inner actuator on the basis of the amount of the displacement, the present position of said external actuator and the travel destination thereof, said second control section controlling the movement of said inner actuator so as to make the first deviation within a predetermined standard range.

8. The device according to claim 7, further comprising a destination setting section that sets a position at which said inner actuator is located when said magnetic head gets to an object position, as said travel destination.

9. The device according to claim 7, wherein said second control section includes an adding section for detecting the present position of said inner actuator by adding the amount of the displacement to the present position of said external actuator.

10. The device according to claim 7, wherein said first control section includes a first feed-forward section for outputting first feed-forward data corresponding to the travel destination, and wherein said external actuator is moved to the travel destination on the basis of the present position of said external actuator and the first feed-forward data.

11. The device according to claim 7, wherein said second control section includes a second feed-forward section for outputting second feed-forward data corresponding to the travel destination, and wherein said inner actuator is controlled on the basis of the first deviation and the second feed-forward data.

12. The device according to claim 7, wherein said second control section includes a subtracting section for detecting second deviation, which is deviation between the travel destination and the present position of said external actuator, and said second control section detects the first deviation on the basis of the second deviation and the amount of the displacement.

13. The device according to claim 7, wherein said inner actuator has an optical reflector, and wherein said displacement sensor emits light to said optical reflector and receives the reflected light, and said displacement sensor detects amount of displacement between said optical reflector and said displacement sensor, without touching, as said amount of the displacement.

* * * * *